United States Patent [19]
Paulange

[11] 3,737,614
[45] June 5, 1973

[54] AUTOMATIC ARC WELDING MACHINES

[76] Inventor: Serge Paulange, 12, Raute de Verton, Nantes 44, France

[22] Filed: Oct. 6, 1971

[21] Appl. No.: 186,960

[30] Foreign Application Priority Data

May 21, 1971 France..................................7120033

[52] U.S. Cl..............................219/60 A, 219/131 F
[51] Int. Cl. ...............................................B23k 9/12
[58] Field of Search ....................219/60 A, 60 R, 61, 219/124–126, 131 F

[56] References Cited
UNITED STATES PATENTS

| | | | |
|---|---|---|---|
| 3,207,881 | 9/1965 | Pagan | 219/60 A |
| 3,555,239 | 1/1971 | Kerth | 219/125 R |
| 3,126,471 | 3/1964 | Nelson | 219/60 A |
| 3,088,018 | 4/1963 | Ross et al. | 219/60 A |

*Primary Examiner*—J. V. Truhe
*Attorney*—Raymond A. Robic

[57] ABSTRACT

Device for performing completely automatic welding operations using fusible or infusible electrode, in accordance with a program directly governed by the path of the electrode, by emission of electric signals corresponding to equal elementary portions of path, such signals being collected by at least one step-by-step motor actuating the programmer. The device is characterized by the fact that the programmer includes means of controlling and adjusting all the welding parameters listed below : welding current strength, current pulsations, wire advance, wire advance pulsations, starting and stopping the unwinding of the wire, the rate of movement of the electrode, variations in such rate, arc fading, the minimum flow of protective gas, adjustment of the position of a torch perpendicularly to the welding wire and parallel to the surfaces to be welded, adjustment of the distance of the torch from the surfaces to be welded, slope of the torch in a plane passing through the welding wire, and slope of the torch in a plane perpendicular to the welding wire. The programmer turns step-by-step under the impulse of the electric signals emitted by the means of moving the torch, so that the angular speed of the programmer is directly proportional to the path travelled by the torch.

14 Claims, 11 Drawing Figures

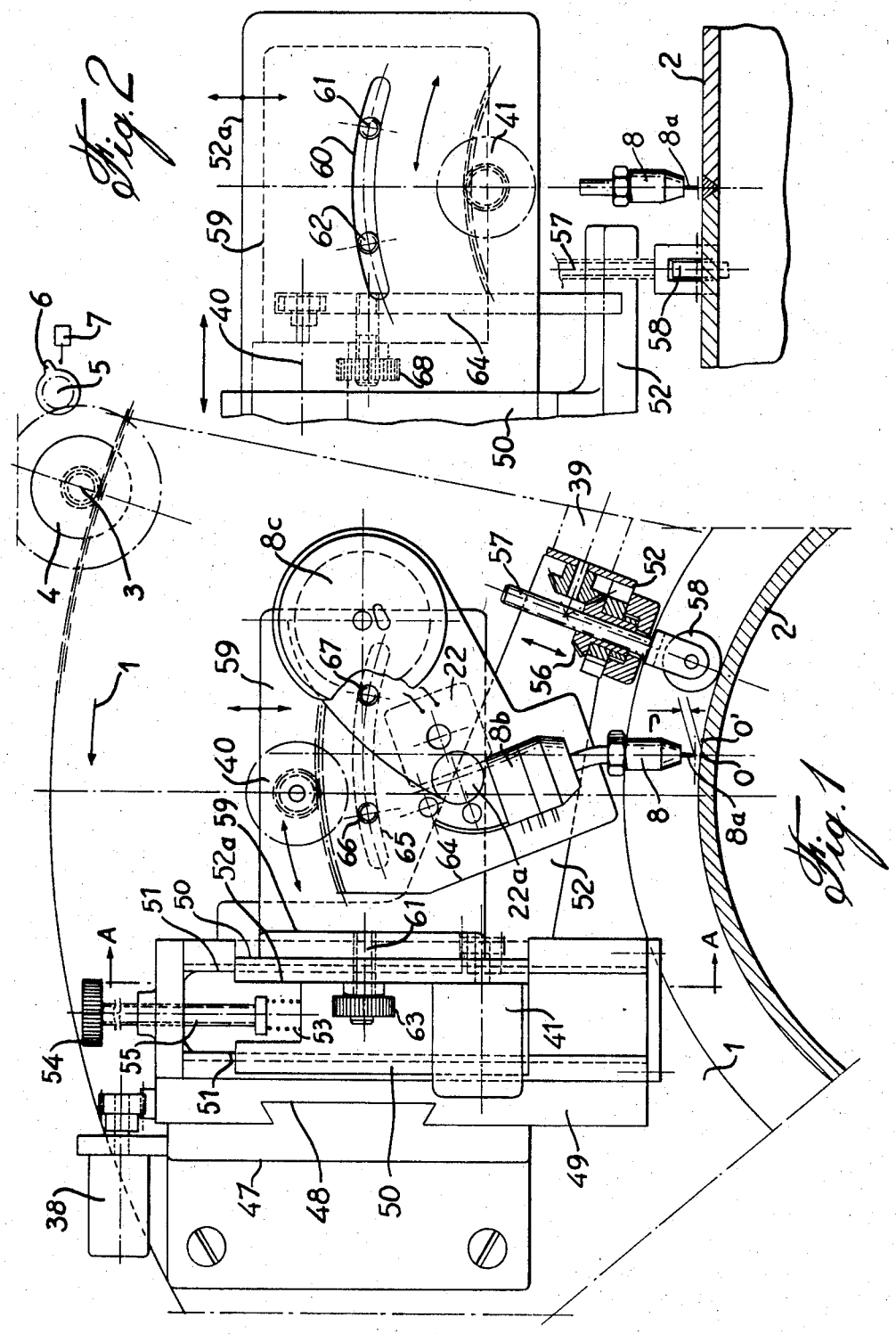

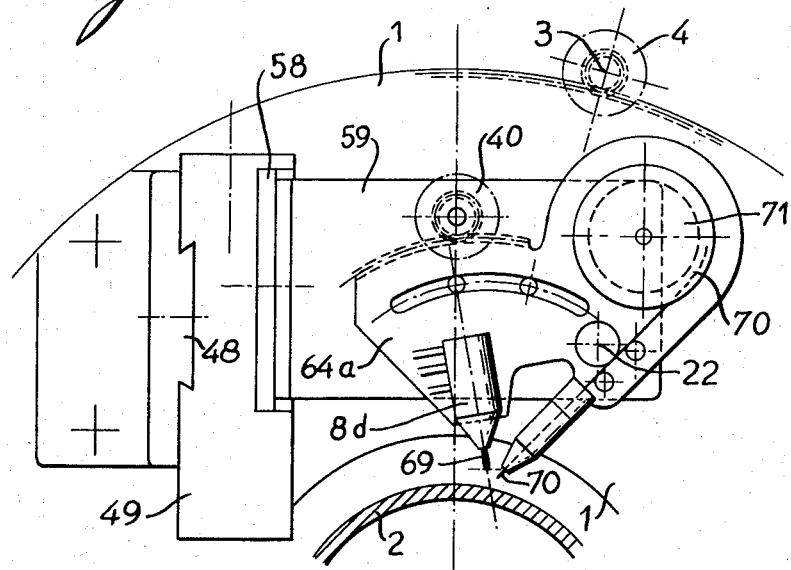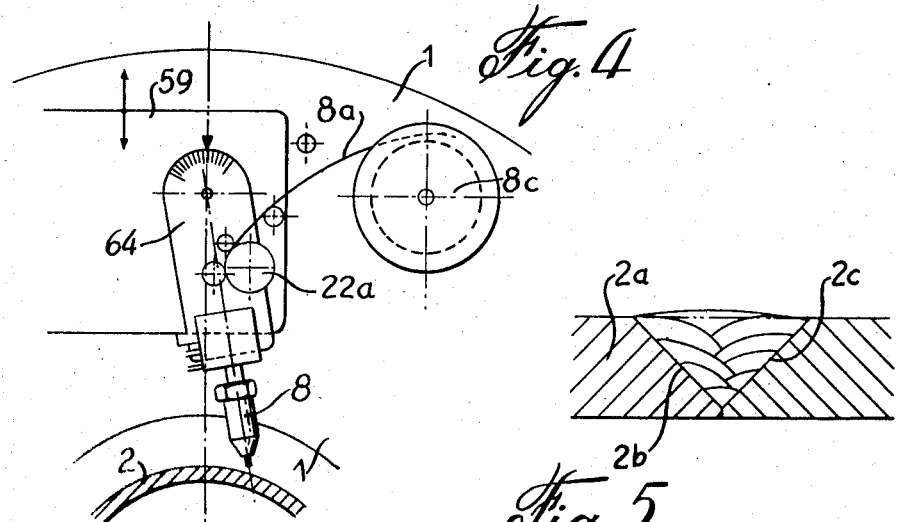

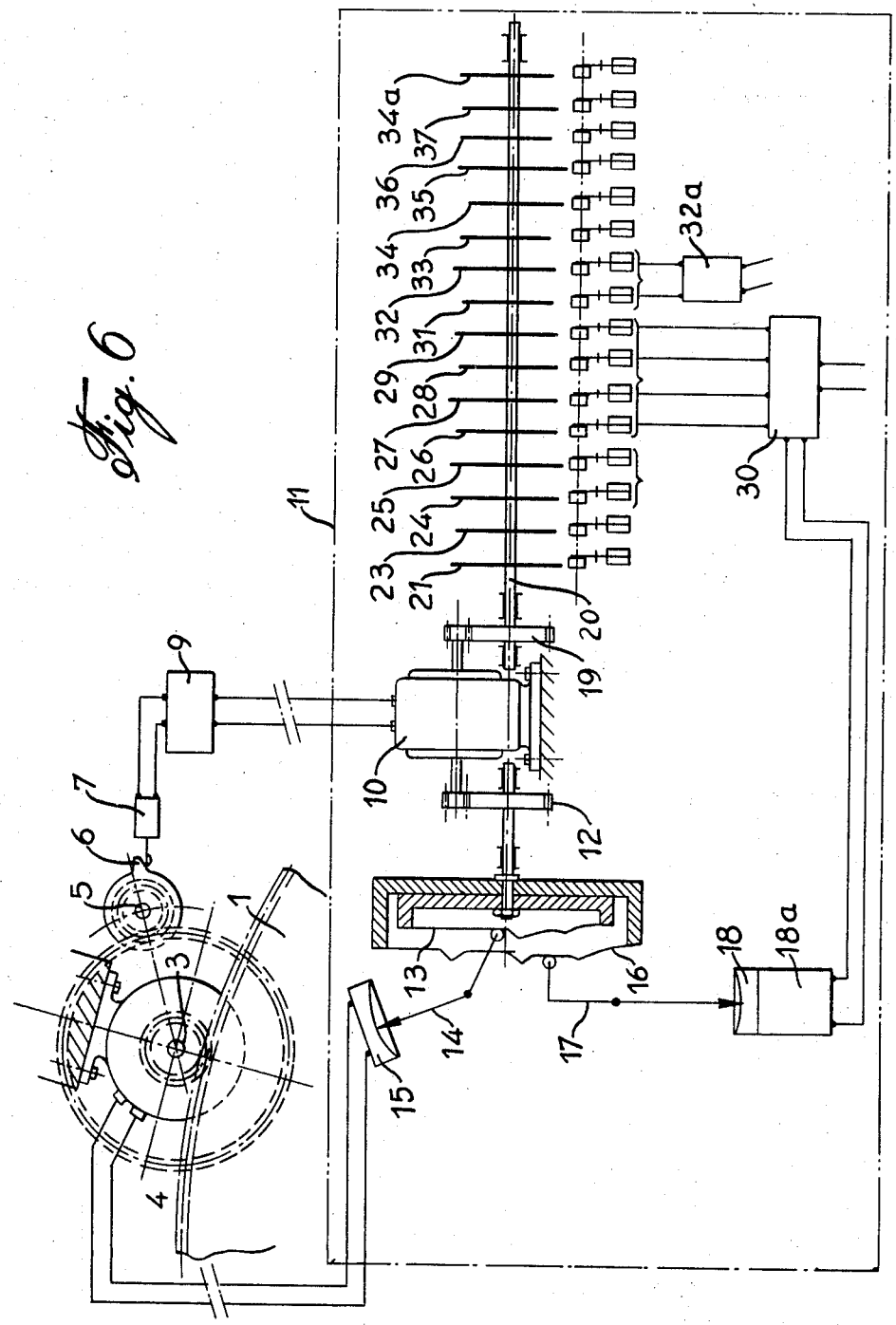

AUTOMATIC ARC WELDING MACHINES

This invention relates to automatic arc welding machines wherein the operating cycle is prescribed and constantly controlled as a function of the advance of the tool (hereinafter called torch) bearing the infusible electrode and the filler metal wire, or possibly the fusible wire conducting the welding current, depending on the method selected.

More specifically, it is intended to improve the completely automatic and controlled performance of all the adjustments to the parameters governing a weld, even when the latter has to include peculiarities such as adjusting the puslations during fusion or sloping the torch, or adjusting the length of the arc or the rate of unwinding of the fusible wire.

This invention uses the method of programming based on impulses emitted by a device which transforms equal portions of path travelled by the torch-holder, i.e. by the electrode, into electric signals. In others words, specific values of the welding parameters, according to the welding cycle previously selected, correspond to any position of the torch along its path. Consequently, the number of impulses is independent of the speed of the torch. It is solely a function of the welding path. According to the invention, the improved programmer does not only deal with the said parameters which it has already been possible to programme and control, i.e. the flow of protective gas, the rate of advance of the torch, the strength and voltage of the welding current and possibly the corrective action of accessories on starting and stopping; it also includes some or all of those which it has not up to now been possible to programme. Thus, the slope of the torch is taken into account and, consequently, the distance of the electrode (fusible or infusible) from the part to be welded. There is also the movement of the torch in a direction parallel to the surfaces to be welded and perpendicular to the welding rod. There is also the rate of unwinding of the filler metal wire. Up to now this rate has been a function of the welding current strength, for a given section of welding rod. And above all there are those which characterize the most recent methods of arc welding and which can only be adjusted and controlled within the framework of a programmed cycle; these are the welding current puslation or the pulsated advance (or unwinding) of the filler metal wire or the pulsation of these two latter factors.

Various methods of obtaining impulses representing elementary portions of the torch's travel along its path are already known. The said impulses are electric signals provided either by a simple mechanical contact system, or a magnetic system, or by an optical system, all these systems being synchronised with the motor moving the torch. These electric signals generally actuate impulse counters or step-by-step motors which use cams to control the various parameters usually corrected by programming (i.e. advance, current strength and voltage, timing when starting and stopping, gas flow). This known principle, following a continuous or sequential cycle, although limited up to now to the adjustable factors mentioned above, has given distinctly improved results over other methods. Unfortunately, the time taken to make a weld and the quality of the weld, regardless of the difficulties, are becoming more and more important. Some operations are still manual, or at least independent of programming. This is the case with the adjustment of the distance of the torch from the part. Known improvements have nevertheless been made to correct the distance between the part and the electrode-holder. They make the length of the arc constant despite irregularities in the surfaces of the parts to be welded. In this way the torch is mounted on a flexible support kept in contact with the said parts by a knurled wheel rolling or sliding on the latter. Some makers have even mounted the torch on a mechanised or jack system, moving perpendicularly to the surfaces to be welded. But these improvements are aimed at independent adjustment which does not come within the framework of a programmed operation. Moreover, to date, no cycle has, as a function of the welding torch path, applied a variation to the slope of the latter (electrode or filler metal or both) in relation to the part to be welded, as some awkward surfaces sometimes demand. Whatever the direction of slope, it is often necessary consequently to correct the distance of the electrode from the part to be welded. This manual operation is tricky and wastes time.

Welding on heavy thicknesses of sheets, for example, often requires several passes in the V-shaped groove formed by the chamfers. These passes are superimposed, but the path of the electrode is not the same every time, The slope of the torch may also be different. Up to now, the position of the torch perpendicularly to its normal path, possibly its slope and consequently its height in relation to the surfaces to be welded, have not been corrected automatically at each pass as a function of the size of the groove formed by the chamfers.

Present and recent are welding methods with filler metal tend increasingly to use a pulsated current, as has been the case for a long time with welds made with an infusible electrode. That is to say, the fusion current, as from a basic value, is subjected to rapid controlled variations. This method allows considerable local temperature increases, without excessively heating the parts to be welded as a whole, and at the same time gives better penetration by the welding material. The duration of maximum current production may be different from that of minimum current production. The duration of minimum current is itself adjustable. The said current values (maximum and minimum) can also differ according to the type of weld. These parameters are at present prescribed by prior manual settings. But it has not yet been possible to programme automatically the variation thereof as a function of a given welding path. This lack raises problems with complicated welds, e.g. in operations with an automatic, orbital welding head (rotation of the tool around a circular part, in a vertical plane) or with all repetitive welds. Pulsating the advance of the wire to obtain the same penetration effects or combining current pulsations with wire advance come up against the same difficulties.

As mentioned above, the known programmer controls the parameters (strength, torch speed, gas flow, timing at the beginning and end of the path) by means of ordinary cams. At the end of each sequence (e.g. orbital welding on a tube), a quick return to zero device allows the next sequence to be started. This arrangement has disadvantages when the number of parameters to be controlled is high and it is necessary to correct them from one pass to the next. The improvements are also directed at this lack.

The method in accordance with the invention and the device deriving therefrom enable the above-mentioned disadvantages to be avoided. They make it possible to perform better quality, more complicated and difficult welds, repetitive or otherwise, without defects. This result is obtained by means of automatically adjusting all the factors mentioned above which go to make the weld, while previously, only some of these factors could be programmed. Thus, awakward surfaces, round or otherwise, can be welded automatically and the groove formed by chamfers in thick sheets can be filled with several passes, etc. In grooves whose width increases towards the top surface, it is possible e.g. to make a weld on one face of the said groove, then on the other at the next pass and so on, the extent of the torch's transversal movement increasing in accordance with the width of the said groove.

Moreover, it means that the method of arc welding by pulsated current or by advancing a pulsated fusible wire, or by pulsating these two together, can be used in accordance with a pre-established programme and is thus not subject to error by the operator. In fact, the association of the device which detects the position of the torch on its path, and the device which obtains pulsated fusion allows a continuous or sequential cycle to be programmed. This cycle, of course, takes into account foreseeable welding difficulties during the torch's travel. The permanent or intermittent combining of the pulsated current and pulsated wire advance method can in any case hardly be expected to give good results except within the framework of a programmed cycle. This method is just as applicable to welds with a tungsten infusible electrode and ordinary filler metal wire as possibly to welds with fusible wire also used as an electrode. In all cases, the weld deforms the parts less by penentrating deeper for the same rod width. The molten bath is better maintained. The performance and life of the electrodes are improved in the case of welding with a tungsten electrode.

It should be noted that even when the pulsations become useless, adjustment of the rate of unwinding of the fusible wire can be obtained automatically as a function of the advance of the torch-holder on its prescribed path, irrespective of the number of other adjustment factors included in the programme. Combined with a device emitting a pulsated current or with a device which gives pulsated unwinding of the fusible wire, or with these two devices, it naturally gives full scope for programming all or some of the other characteristic welding factors from the path of the torch (impulses): gas flow, average welding current values, rate of advance of the torch-holder, average wire unwinding speed, slope of the torch in all directions, its distance from the parts to be welded, its position in a plane perpendicular to the path of the tool. Finally, in an orbital automatic welding operation (e.g. on tubes) several passes can be made, i.e. several revolutions with the same system of special cams, improving the continuity and the chance to correct certain parameters during one or several of the said passes, without having recourse to the rapid return to zero process.

The device covered by this invention comprises two separate parts. The first includes the means needed to transform signals emitted equidistantly along the path of the tool, which transformation enables each parameter to be adjusted by means of step-by-step motors and cams positioned characteristically, the first unit being called a programmer.

The said parameters controlled by the programmer, taken as a whole or in part, include: current strwngth, torch speed, current pulsations, wire advance, wire advance pulsations, the time when the wire is started or stopped, arc fading characteristics, temporary variations in torch speed from the basic programme, the gas flow.

The second part, essential to an understanding of the invention, includes the whole of the movements and the means enabling the torch to work automatically during the operation, in accordance with the instructions transmitted by the programmer cams. The programmer receives the instructions from the system driving the torch-holder along the path to be travelled by the electrode and this path, whether it is repetitive or not, is imaginarily cut up into equal elementary portions. During each of the latter, an electric signal is emitted. The angular movement of the programmer cams is thus in direct ratio to the movement of the torch. It is the said cams which control the above-mentioned parameters.

A good understanding of the invention will be obtained from the following description and from the attached drawings. This description is only given as a non-limiting example. It relates to an automatic welding head known as the orbital type, i.e. the torch is driven by a support which revolves around a round body, e.g. a tube. In the drawings, FIG. 1 is an overall frontal view of the welding head, showing the means and movements for dimensional adjustment;

FIG. 2 is a left-hand view of the head of FIG. 1 along a line AA showing the means of sloping the torch;

FIG. 3 is a frontal part view of a preferred variation with the torch bearing an infusible electrode and a separate filler metal wire;

FIG. 4 is a frontal part view of a variation with the spool of wire mounted directly on the mobile toolholder plate;

FIG. 5 is a sectional view of a weld on a thick sheet with several passes;

FIG. 6 is a diagrammatic view of the components which make up the programmer which receives the electric signals;

Figure 7:
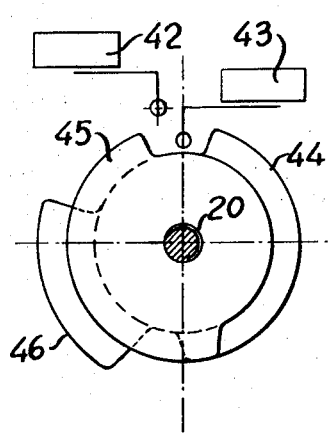
FIG. 7 is a view of the mounting of one of the cams (in at least two parts) in the programmer.
Figure 8:
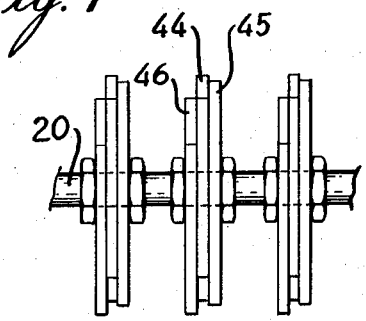
FIG. 8 is a profile view of the cam shown in FIG. 7.

As showin in FIG. 1, the means for adjusting the torch in relation to the parts to be welded are mounted on a crown 1 revolving around a part, such as e.g. the tube 2, on which one or several welding passes are to be made automatically. This welding head, which is drawn diagrammatically, will be described later in this text, as an example. It is articulated, with 4° of freedom, on the crown 1, itself driven by a toothed rack and pinion system 3, the said pinion (with fixed axis) being driven by a variable speed motor (e.g. direct current) 4. The latter also drives a multiplier actuation a pinion 5, so that the angular speed ratios of parts 5 and 1 have a selected value n. The pinion 5 is fitted with a finger 6 closing a contact 7 at each revolution. It is evident that the contact 7 will thus emit n electric signals during the full rotation of the supporting crown 1, which cuts the path of the torch 8 around the tube 2 into $n$ equal imaginary portions (one per electric signal) during the first complete cycle (from 0, start of the weld, to 0' end of the first cycle). The number n may be as high as may be requird by the accuracy of the adjustment of the welding parameters, such as e.g. 100 or 1,000.

The means of creating electric signals may be different. For example, flashes of light actuating a photoelectirc cell or a magnetic body passing in front of a contact with a flexible lamina, which are means already in current use.

Figure 9:
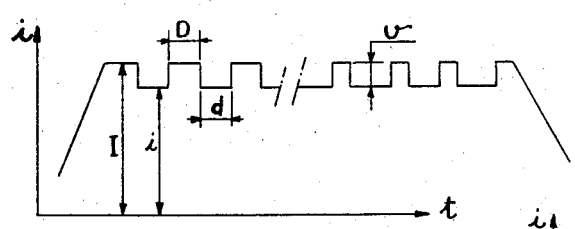
FIG. 9 is a diagram (welding current strength as a function of time) relating to the pulsated current.
Figure 10:
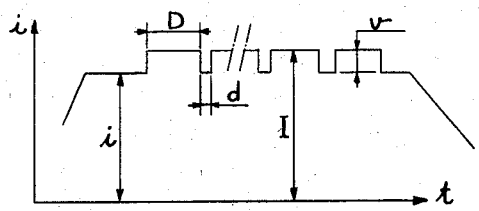
FIG. 10 is another diagram relating to the pulsated current with other characteristic values.

FIG. 6 shows the use of the electric signals emitted by contact 7, then filtered and shaped by any means 9 (electronic components) and finally received by a step-by-step motor 10 (or a motor which works by impulses, each of the latter making it turn a specific fraction of a revolution). The said motor 10 is mounted in a unit 11 called the programmer housed in the same cabinet in a fixed position outside the welding head, but close to the working position. With a suitably selected reduction device 12 it drives an initial set of cams shown in section in accordance with their diameter in FIG. 6. The cam 13 fixes the programme for the welding current strength value during the travel. The roller device 14 actuates an electronic device 15, selected from among known systems, which precisely and accurately varies the speed of the direct current motor 4 driving the crown 1. The cam 16 acts on the welding current strength by means of the roller device 17 and adjusting components 18 and 18a. The latter are selected from known types enabling the said current to be adjusted, controlled and varied as a function of the parameters affecting it, notably voltage. The cams 13 and 16 may make a revolution or a fraction of a revolution when the crown 1 makes a complete rotation, corresponding in the example selected to a welding cycle. They may also make one revolution for several cycles, when e.g. it is necessary to make several superimposed passes. To achieve these various possibilities, either the reduction ratios can be changed (at 12 or at 5), a reduction which may moreover be varied gradually, or the number of signals recorded or received can be modified. The step-by-step motor 10 also drives a second set of cams, possibly by means of a suitably selected reduction device 19. Several cams whose functions are defined below are mounted on the same shaft 20. The cam 21 relates to the fusible wire. It controls the moment when the said wire begins its advance, then governs its speed, variable or otherwise, according to the thickness of the deposit, then controls its stoppage. Starting and stopping can, of course, be gradual. The wire is fed by a direct current motor 22 (FIG. 1) with a known system of knurled driving wheels. The cam 23 controls certain speed changes in the motor 4 driving the corwn 1. It serves, e.g. and possibly, to correct the advance of the torch, especially at the start and finish of the cycle, complementing the main cam 13. The cam 24 serves to control the fading of the arc at the end of the operation, i.e. gradually to weaken the current by the addition of resistances, complementing the cam 16. The cam 25 controls, at a certain time, the cessation of current regulation during fading. The latter can easily be controlled in the welding method comprising an infusible electrode and a filler metal wire. The same does not apply to the fusible electrode wire method. The cams 26, 27, 28, 29 adjust the various parameters (I, i. D, d) of the pulsated current from a minimum value $i$ (FIG. 10) fixed by cam 16, or from a maximum value I (FIG. 9) fixed by the same cam. In other words, a complementary potentiometer comes or is shunted into the circuit for a specific time D, when the said potentiometer is added and $d$, when it is removed. This occurs in accordance with a certain rhythm which can very in accordance with the form of graph (strength/time — see FIG. 9 and 10, as an example) which it is desired to obtain. The production of these impulses, i.e. fixing the moments when the potentioneter(s) enter into or leave the electric circuit, is achieved by any adjustable means 30 such as a time-switch or other devices with electronic components. Of course, the said cams do not act directly on the current, but via a contact or a set of contacts in 30. At a given time, via relays, they thus being into play components contained in 30 which modify the values of the pulsation parameters in accordance with a known process. It is therefore possible separately to adjust the value $v$ of the amplitudes and the times D (high strength) and $d$ (low strength). It is also possible to control the start and the end of the pulsations, which explains the four cams provided for this operation, which cams may in some cases be reduced to a lesser number by associating certain parameters in the electronic relay device 30. As an example, the values of D and $d$ are about 0.1 to 1 second, in normal operations. The cams 31 and 32 control the impulses advancing the fusible wire; they act by micro-contact on a device 32a which interrupts the rotation of the motor 22 (complementing the orders given by the cam 21) for a certain time and in accordance with an adjustable rhythm, which parameters are synchronised with the current pulsations. When the pulsations are solely produced by the wire or solely by the current, the corresponding superfluous instructions are cancelled either electrically (opening contacts and relays) or mechanically (by e.g. lifting the contacts on the cams). A single cam may replace 31 and 32, if the system of synchronisation with the pulsated current control so allows. The cam 33 is designed to vary the flow of protective gas or at least the limit of the safety flow (by any known means). The other cams 34, 35, 36, 37, control the movements of the torch 8, i.e. respectively:

its movement parallel to a generatrix on the tube 2 (by the motor 38 on the welding head in FIG. 1), its distance from the surfaces to be welded, i.e. its distance from the tube 2 (by the motor 39), its slope in a plane perpendicular to the axis of the tube 2 (by the motor 40), and its slope in a plane passing through one axis of the tube 2 (by the motor 41).

These two latter degrees of freedom, governed by the path of the torch, via the cams 36 and 37, enable successive deposits to be made at different slants in the groove formed by chamfers on thick parts 2a (FIG. 5). It is clear that the path is not the same on each cycle, nor is the slope of the torch. In this case, the cam 34 also be used to move the unit supporting the torch parallel to a generatrix. Height correction by the cam 35 is usually essential.

Taking as an example the lining of the groove formed by the chamfers 2b and 2c, it can be seen that at the end of each cycle the torch can be shifted (with or without slope), a shift the width of which is a function of the size of the groove (2b – 2c), every time a deposit has just been made. This automatic variation of the width can be provided by cams 34 – 35 – 36 – 37 combined. But it can also more easily be obtained, in simple cases, by a single other cam which we shall call 34a which, at the end of each cycle, modifies the width in accordance with a given programme. This result is obtained either by increasing the pace of one or several of the motors 38 – 39 – 40 – 41 at each cycle change. It can also be obtained by step contacts successively put into service or shunted so that the travel of the intermediate support(s) in question is increased after each pass (or cycle).

Each cam mounted on the shaft 20 actuates one or several micro-contacts such as 42 and 43, as shown in FIG. 7. The said contacts can be situated on several levels, in order at a given moment to cause the opening or closing of a circuit which modifies (or corrects) the value of the parameter corresponding to the said cam. As is already evident from the foregoing, the modification can be made via the means appropriate to the parameter. To give non-limiting examples: a potentiometer, motorised or otherwise; an electronic device for varying the speed of the direct current motor, a simple contact relay for starting a synchronous motor for a time prescribed by the cam, previously set time-switches, etc.

In order to be able to programme a welding operation accurately, each cam is made up of two or several discs, 44, 45 and possibly 46, locked laterally together on the shaft 20 by means of quick-fastening nuts, which locking is effected after orienting the said discs in relation to one another. In this way, a large number of combinations can be obtained to meet the requirements of the programme. The said cams mounted on the shaft 20 are not necessarily all used, as the welding operation may be more or less complicated. The shaft 20 can be synchronised with the cams 13 and 16 when the weld only comprises one cycle. But it can also turn twice or three times and so on . . . faster if the operation is carried out in 2 cycles or 3 cycles and so on . . . when each cycle has the same characteristics. If the cycles differ substantially from one another, it is preferable for the shaft 20 to be at the same speed as the cams 13 and 16. The latter are not all-or-nothing acting on the strength and on the rate of advance of the torch. Their profiles are such that they define directly the value of these two basic parameters for each angular position of the said cams.

As already mentioned above, the reduction devices 12 and 19 which drive the sets of cams can be variable and therefore adjustable, either by means of pinions sliding as in a gearbox or by gradual ratio systems such as a disc and a sliding friction wheel.

In order for the welding head to be able to respond to the programme orders, the various articulations holding the torch and bearing on the crown 1 have to be motorised. This aspect emerges from the description given below of the said head. Generally, the motors are direct current, variable speed motors. In some cases, they can be step-by-step motors receiving secondary impulses emitted on basis of the instructions from the corresponding cam. The said head (FIG. 1) is, e.g. designed for welding with a fusible electrode, the wire 8a passing inside the torch 8. The motor 22 pushes the said wire by means of the pinions and wheels such as 22a. The body 8b of the torch receives the protective gases and possible cooling fluid. The wire is wound on a spool 8c.

The crown 1 bears a right-angle bracket 47 on which the part 49 slides, in a slide 48. This movement is effected parallel to the axis of revolution of the tool, by means of the motor 38 actuating a rack and pinion system. Another part 50 (vertical slide 51) bearing an arm 52, slides on the part 49. The end of the arm 52 holds a roller 58 bearing constantly on the tube 2 to be welded, held there by a spring 52 the tension of which can be adjusted by the milled knob 54 and the screw 55. The motor 39 turns the nut 56 which moves the screw 57 along its axis, which screw is integral with the roller 58 fixed in rotation. The dimension J can thus be varied.

The parts 50 and 52 together bear a rib 52a (FIG. 2) perpendicular to the face of the crown 1. A right-angle part 59 slides pivotally on this rib by means of an aperture shaped like the arc of a circle 60 in which two adjusted studs 61 and 62 engage. One of them is fitted with a milled nut for locking 63. The centre of the pivotal movement is approximately a point situated on the electrode 8a. It is produced by the motor 41, via a pinion (mounted on 52a) and a toothed segment integral with the part 59. Finally, the torch support 64 slides on the latter pivotally. The centre of the rotary movement is also situated approximately on the electrode 8a, by means of an aperture shaped like the arc of a circle 65, in which the studs 66 and 67 screwed into the support 64 engage, locking being possible by means of the knob 68. The motor 40 drives (pinion-toothed segment) the support 64.

These two latter articulations (64 in relation to 59 and 59 in relation to 52a) can also be obtained by means of an axle in a bore, still with a rack and pinion, if the rotation of the part does not need to have the electrode as its centre. The movements will then be less accurate.

FIG. 3 shows a partial view of a head with an infusible electrode 69, held and cooled by the torch 8d. The fusible wire 70 carried by the spool 71 unwinds by means of the same motor 22 actuating knurled wheels, as before. The support proper of the torch 64a is articulated, like the support 64, by means of the motor 40 (with rack and pinion). The remainder of the head is the same as before.

In accordance with a variation, the spool of fusible wire can be mounted directly on the crown 1, as shown in FIG. 4. The wire 8a is then supported by as many rollers as necessary in order to maintain a suitable radius of curvature. The support 64 is thereby simplified. It is shown with an axle of articulation instead of an aperture shaped like the arc of a circle, as an example. The same applies to a welding head with infusible electrode and filler metal.

Figure 11:
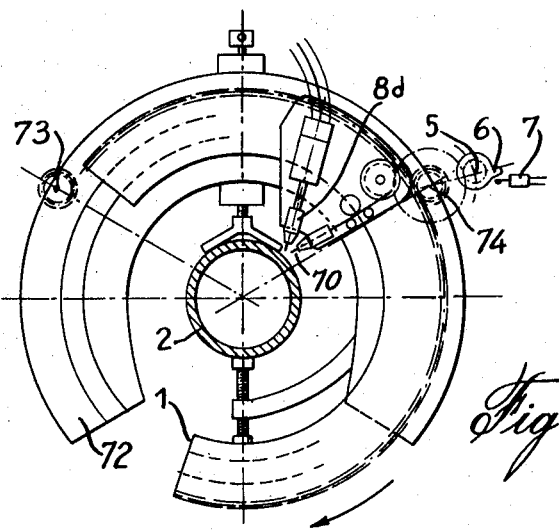
FIG. 11 is a diagrammatic frontal view of an orbital welding head with U-shaped crown and support, and impulse emitter on one of the driving pinions.

FIG. 11 shows that the mobile crown 1 can be open in the shape of a letter U, as may the support 72 for the said crown, which support is fixed on the tube 2 to be welded. The crown bearing the torch 8d with wire 70 and the various articulations thereof described above slides pivotally on the support 72, concentrically to the latter. The flexible piping and cables feeding the torch roll around columns fixed on the support 72. The opening in the parts 1 and 72 is such that they can be fitted round the said tube, when they are in concordance. When the crown 1 is driven by the pinions (or tangent screw) 73 and 74, strictly synchronised, at least one of the latter is always engaged, even when the opening is opposite the other. One of the pinions 74, for example, drives the finger 6 through the multiplier 5, as explained at the beginning of the description; the said finger 6 via the contact 7 emits impulses to the programmer.

It goes without saying, and indeed is obvious from the foregoing, that the invention is not confined to the examples described above. On the contrary, it includes all possible variations, provided they are not outside the scope of the claims.

This invention is used for complicated welds calling for complete automation. Thus, it is eminently suitable for repetitive parts which require high-class welds. It is mainly applied to orbital welds, i.e. where the tool rotates around a round part for welding. But it can also be used for welds on any other kind of flat or awkward surface. There is also a use for it in operations other than welding; polishing, cutting up and even some kinds of repetitive machine-finishing.

I claim:

1. Automatic welding apparatus for welding, for example, two tubes end to end in a continuous welding operation comprising:
    a. a single welding head supporting a welding torch;
    b. a crown supporting said welding head and mounted for rotation in the same direction of rotation around at least one full circumference of the tube to be welded;
    c. means for driving said crown;
    d. means for generating welding current pulsations;
    e. means for generating wire advance pulsations;
    f. means for mounting said welding head on said crown for movement of the torch parallel to the axis of the tube to be welded;
    g. means for mounting said welding head on the crown so as to permit variations of the distance of the welding torch from the surface to be welded;
    h. means for mounting said welding head on said crown for permitting variations of the angle of the torch in a plane perpendicular to the welding seam;
    i. means for mounting said welding head on the crown for permitting variations of the angle of the torch in a plane parallel to the welding seam;
    j. means responsive to rotation of said crown for generating electric pulses corresponding to equal elementary portions of the path of said torch;
    k. a step-by-step motor energized by said electric pulses;
    l. a programmer mounted outside the said welding head and including a shaft driven by said step-by-step motor and upon which are mounted a series of cams, said cams being adapted to control said welding current pulsations, said wire advance pulsations, said movement of the torch parallel to the axis of the tube to be welded, said variations of the distance of the welding torch from the surface of the tube to be welded, said variations of the angle of the torch in a plane perpendicular to the welding seam, and said variations of the angle of the torch in a plane parallel to the welding seam.

2. Automatic welding apparatus as defined in claim 1, wherein said means for generating electric pulses comprise a finger operated by said crown through reducing gears so as to generate plural electric pulses during each revolution of the crown in order to permit said cams to continuously control the welding parameters at any moment of the welding operation.

3. Automatic welding apparatus as defined in claim 2, wherein the shaft supporting the cams is coupled to the motor through a reduction device so as to cause said cams to rotate less than 360° in order to permit each cam to control its associated parameters for the full welding operation even if such welding operation lasts for several revolutions of the torch around the tube to be welded.

4. Automatic welding apparatus as defined in claim 1, wherein additional cams are provided for controlling the following parameters: the average welding current strength, the flow of protective gas, and the speed of rotation of the welding head.

5. An automatic welding apparatus as defined in claim 1, wherein each cam is made of several discs which may be oriented one with respect to the other and locked laterally together on the shaft by means of quick fastening nuts so as to permit to obtain a large number of combinations of profiles for controlling the welding parameters.

6. An automatic welding apparatus as defined in claim 1, wherein the means for varying the position of the torch parallel to the axis of the tube comprises a bracket secured to said crown, an horizontal slide adapted to slide on said bracket, and a motor mounted on said bracket and adapted to move said slide by means of a rack and pinion system under the control of its associated cam.

7. An automatic welding apparatus as defined in claim 6, further comprising a vertical slide secured to said horizontal slide, an arm secured to said vertical slide, a shaft threaded into the end of said arm, a roller secured to the end of said shaft and bearing against the tube to be welded, and a motor for rotating said shaft under the control of its associated cam.

8. An automatic welding apparatus as defined in claim 7, wherein the means for varying the angle of the torch in a plane perpendicular to the welding seam comprises a rib secured to said vertical slide and having an aperture therein in the shape of an arc of a circle, and a right angle part provided with two studs in one of its right angle portions and sliding in said aperture so that the center of pivotal movement is a point situated on the end of the torch contacting the tube to be welded, and a motor for pivoting said right angle portion through a rack and pinion system under the control of its associated cam.

9. An automatic welding apparatus as defined in claim 8, wherein the means for varying the angle of the torch in a plane parallel to the welding seam comprises the other portion of said right angle part which is also provided with an aperture therein in the shape of an arc of a circle, a support for said welding head provided with studs sliding in said aperture so that the center of pivotal movement is a point situated on the end of the torch contacting the tube to be welded, and a motor mounted on said right angle part and moving said support through a rack and pinion system under the control of its associated cam.

10. An automatic welding apparatus as defined in claim 4, wherein the means for generating welding current pulsations comprises a first cam controlling the average value of the current strength, second and third cams operating suitable potentiometers so as to modulate said average current strength in order to determine the maximum and minimum values of the pulsated current, and fourth and fifth cams controlling the length of time during which said potentiometers are operated.

11. An automatic welding apparatus as defined in claim 1, wherein said means for generating wire advance pulsations comprises a wire feeding motor associated with said welding head, an electronic control device for controlling the operation of said motor, a first cam operating said electronic control device for controlling the average speed of said motor, and a second cam operating on said electronic control device for periodically interrupting the rotation of the motor.

12. An automatic welding apparatus as defined in claim 11, wherein the current pulsations are synchronized with the wire advance pulsations.

13. An automatic welding apparatus as defined in claim 1, wherein said crown has a U-shaped cross section, and wherein said means for driving said crown comprises a support of U-shaped cross section overlapping said crown and fixed on the tube to be welded, said support carrying gears coupled with said crown and a motor for rotating said gears.

14. Automatic welding apparatus as defined in claim 13, further comprising columns secured to said support for permitting winding of flexible pipings and cables feeding the torch from said programmer, thus permitting to wind such pipings and cables plural turns around the support when the welding operation requires plural revolutions around the tube to be welded.

* * * * *